United States Patent
Ord

[15] 3,704,845
[45] Dec. 5, 1972

[54] AIRPLANE HIJACKING PREVENTION SYSTEM

[72] Inventor: Michael Ord, 5267 Wilkins Avenue, Pittsburgh, Pa. 15217

[22] Filed: Jan. 14, 1971

[21] Appl. No.: 106,337

[52] U.S. Cl. .................................................244/121
[51] Int. Cl. ..................................................B64c 1/10
[58] Field of Search ........244/1 R, 1 P, 118 R, 118 P, 244/119, 121; 109/21.5

[56] References Cited

UNITED STATES PATENTS 2,908,766   10/1959   Taylor .................................244/1 R

*Primary Examiner*—Edward A. Sroka
*Attorney*—Brufsky, Staas, Breiner and Halsey

[57] ABSTRACT

A method and system for preventing airplane hijacking provides for isolating the pilot and the cockpit from the passenger cabin of the airplane while nevertheless maintaining the necessary communication therebetween for assuring safety of the passengers and the airplane. Physical access between the cabin and the passenger compartment is restricted by a door which can be opened only from the cockpit, both the door and the associated bulkhead being of fire resistant, bulletproof material. An audio system provides verbal communication only from the cockpit to the cabin, and not in the reverse direction. Communication from the cabin to the cockpit is afforded exclusively by an electrical signalling system affording communication only of predetermined messages, specifically excluding any indication of hijacking attempts. The pilot's primary response to any emergency signalling indication is to land at the nearest airport. By assuring that all passengers are warned in advance of the installation in a plane of the system of the invention, potential hijackers are discouraged from even attempting to hijack a plane, since any effort to that end would be totally fruitless.

8 Claims, 4 Drawing Figures

PATENTED DEC 5 1972

3,704,845

INVENTOR
MICHAEL ORD

BY Brufsky, Staas,
Breiner & Halsey

ATTORNEYS

AIRPLANE HIJACKING PREVENTION SYSTEM

BACKGROUND OF THE INVENTION

1. Field of the Invention

This invention relates to protective systems for aircraft and, more particularly, to a protective system and a method of operation thereof for preventing hijacking of aircraft.

2. Description of the Prior Art

Currently, there has arisen a serious problem of hijacking and attempted hijacking of airplanes. Extensive efforts have been made heretofore to prevent airplane hijacking in view of the obvious danger it presents, as well as the expense and inconvenience. For example, one approach has been to detect the presence of weapons on passengers entering the aircraft. Another has been to provide guards on the flights.

Each of these prior art approaches has been unsatisfactory. For example, so-called frisk machines utilized for detecting concealed weapons on passengers are incapable of detecting plastics. Yet, many weapons adequate to support a hijacking effort can be made of plastics and, additionally, can be quite small, thereby avoiding detection by machine or visually. These detection systems, even assuming that they could be developed to detect all possible materials from which weapons might be formed, are sill undesirable in view of the initial cost of installation thereof and the continuing maintenance costs and requirement for maintaining guards to apprehend those passengers carrying articles detected by the equipment.

The provision of armed guards on the flights presents a substantial cost. Currently, such guards are utilized only on certain international flights and the cost thereof is estimated at $8,000,000.00 per year. Further, armed guards present a substantial danger. An exchange of gunfire with a would-be hijacker in the confined area of the cabin of an airplane could itself be fatal to many passengers, as well as presenting the danger of puncturing the fuselage of the plane and possibly causing it to crash.

These and other attempts to prevent hijacking of aircraft have proven inadequate and unsuccessful. In view of the increasing frequency of hijacking and the dangers which hijacking presents, it is imperative that a system be installed in aircraft which is low in cost and thus feasible for uniform use, and which if foolproof and effective in operation.

SUMMARY OF THE INVENTION

The present invention comprises a system and method for preventing hijacking of aircraft. In general, the system restricts access to the pilot's cabin from the passenger cabin, thereby preventing a hijacker from directly confronting the pilot of the aircraft. Further, communication from the cabin to the cockpit is restricted to the extent that there is, in fact, no means of informing the pilot that a hijacking attempt is underway. An electronic signalling system does, however, provide for indicating to the pilot any of various other predetermined routine or emergency messages, as may be required. In response to any emergency thus indicated, the pilot's only action is to land at the nearest airport. Of importance to the success of the present invention is extensive publication of the safety system and its installation. Potential hijackers thereby would realize the futility of hijacking attempts and thus be dissuaded at the inception from making any such attempt.

More particularly, and in accordance with the invention, the cockpit and cabin are separated by a fire resistant, bulletproof bulkhead and associated door which can be opened only from the pilot's cockpit. In general, the pilot and flight crew enter the cockpit prior to any passengers entering the plane, and remain therein until all passengers have disembarked upon arrival at a destination.

Verbal communication from the pilot's cockpit to the passenger cabin may be provided by a conventional audio system, but the reverse direction of verbal communication is eliminated. However, an electrical signalling system is provided whereby a crew member, such as a stewardess, may signal to the pilot any of various routine or emergency messages. The signalling system may, for example, be implemented by a coded light array in accordance with which the pilot receives and comprehends the message being transmitted from the cabin.

The system of the invention is low in cost of installation and requires little maintenance. Further, its method of use in preventing aircraft hijacking is quite simple and assures the safety of both passengers and crew at all times.

A DETAILED DESCRIPTION OF THE INVENTION

Figure 1:
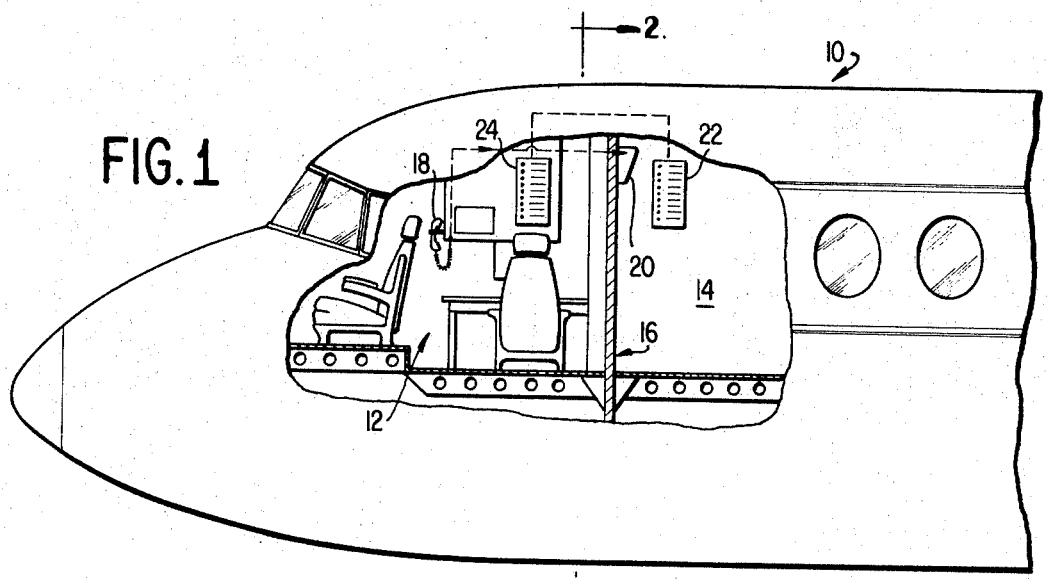
FIG. 1 is a diagrammatic elevational view of a portion of an airplane fuselage showing the cockpit and a front portion of the passenger cabin thereof and illustrating the installation therein of the hijacking prevention system of the invention.

FIG. 1 is shown, in diagrammatic form, a portion of an airplane fuselage sufficient to explain the system of the invention as incorporated therein. Particularly, the fuselage 10 comprises a forward or front portion 12 typically termed the cockpit. The passenger compartment, or cabin, is shown at 14. The cockpit 12 and cabin 14 are separated by a bulkhead 16 which, in accordance with this invention, is made of a fire resistant and bulletproof material, which materials are well known to those skilled in the art of aircraft design.

Verbal communication is afforded between the cockpit 12 and the cabin 14 by an audio system, as illustrated by a microphone 18 and loudspeaker 20. However, in accordance with the invention, verbal communication is restricted to the path shown and no form of verbal communication from the cabin 14 to the cockpit 12 is permitted.

The only communication from the cabin 14 to the cockpit 12 is that afforded by an electrical signalling system including a transmitting station 22 in the cabin 14 and a receiving station 24 in the cockpit 12. The signalling system is described in greater detail in relation to the enlarged view thereof shown in FIG. 4.

Figure 2:
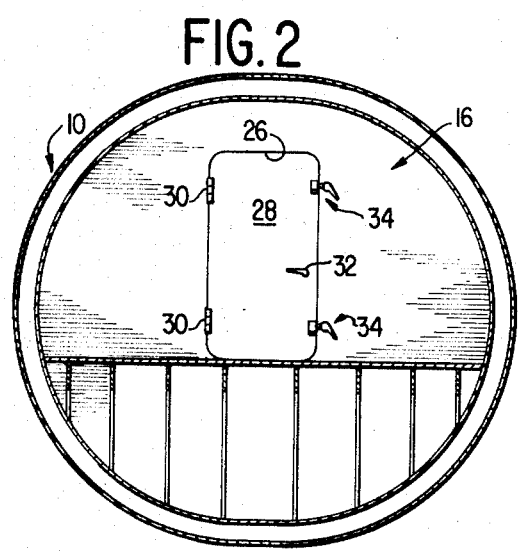
FIG. 2 is a cross-sectional view of the airplane fuselage taken along the line 2—2 of FIG. 1 and showing the bulkhead and associated door isolating the cabin and the passenger compartment.

As better seen in FIG. 2, the bulkhead 16 includes a doorway 26 enclosed by a door 28. The door 28 is hinged, as shown at 30, to the bulkhead 16. The door may thus be swung open in an arc into the cockpit 12 or instead may be hinged to open rearwardly into the cabin 14. There are further provided a conventional handle 32 and latch devices 34 for securing the door 28 in its closed position.

Figure 3:
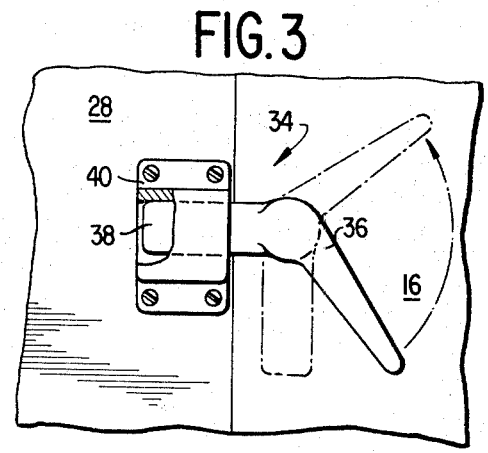
FIG. 3 is an enlarged view of a latching mechanism for the door enclosing the doorway in the bulkhead as shown in FIG. 2.

More specifically, and in accordance with the invention, it will be appreciated that the prevention of hijacking requires the assurance that the potential hijacker cannot break into the cockpit and force the pilot to change the scheduled flight plan. Accordingly, the latches 34 are operable only from the cockpit 12 for securely locking the door 28 in its closed position. The latch 34 is shown in greater detail in FIG. 3 to include a handle 36 rotatably mounted to the bulkhead and having a lug 38. A bracket 40 is mounted on the door and receives the lug 38 in the engaged or latched position. Any suitable form of latch mechanism may be employed, and a specific further example is the type used on submarines. In general, therefore, it is to be understood that the combination of the door and the bulkhead with the latching mechanism operable only from the cockpit side provide reliable isolation of the pilot from the passengers during all in-flight operations.

As previously noted, the invention contemplates affording verbal communication from the cockpit to the cabin, as in currently provided on most commercial airplanes. Communication in the reverse direction, however, is provided by the electronic signalling system shown generally in FIG. 1, and in greater detail in FIG. 4. Any desired number of predetermined messages may be communicated from the cabin to the cockpit and illustrative such messages are shown in conjunction with the transmitter 22 and receiver 24 in FIG. 4. Particularly, the crew, such as a stewardess, must be able to communicate to the pilot each of the messages there indicated and, for example, the use of oxygen, presence of a fire on board, any form of equipment malfunction that would require the immediate attention of skilled personnel for its repair, medical emergencies, unruly passengers and the like. A column of buttons 42 is provided in the transmitter 22, each button being associated with one of the messages. Actuation of any such button affords the transmission of a signal coded message to the receiving station 24 in the cockpit. Various types of apparatus for responding to the transmitted signals may, of course, be provided. For illustrative purposes, the receiving station 24 is shown to include a column 44 of indicator lamps which are selectively lighted to indicate the message produced by actuation of the corresponding button 42 of the transmitting station 22.

Figure 4:
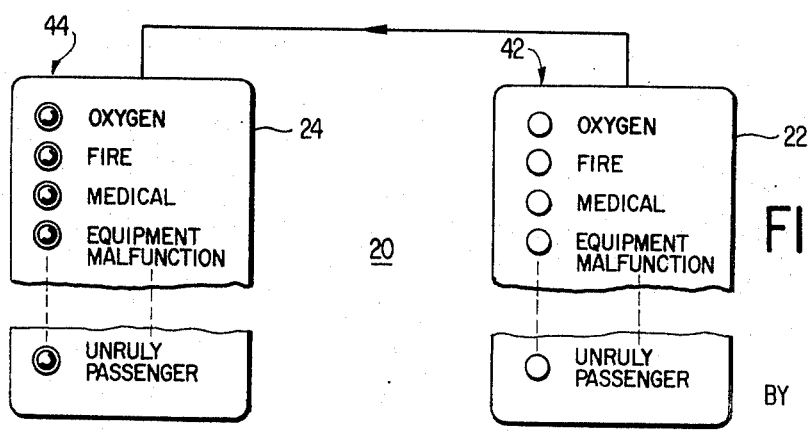
FIG. 4 is a more detailed block diagram of the signalling and communication system providing communication from the passenger cabin to the cockpit as illustrated in FIG. 1.

In lieu of, or in addition to, the lamp indicating system shown in FIG. 4, various audible alarm indications may be provided to the crew in the cockpit. If desired, pre-recorded messages may be provided from a magnetic tape reproduction system responsive to the signal coded message from the transmitter 22. It is, of course, important that the signalling system be designed to prevent jamming and any other malfunctions so that an accurate indication of the emergency condition is assured to be provided to the pilot. Signalling systems capable of providing such reliable indications are, of course, well known in the art. Whereas the specific messages illustrated in FIG. 4 all relate to emergency conditions, it will, of course, be appreciated that the signalling system may be designed to communicate other information to the pilot which is not of an emergency status but which may be convenient and useful to him in controlling the flight of the aircraft.

In response to the receipt of any emergency message over the signalling system, the pilot preferably arranges immediately for the landing of the aircraft at the nearest available airport. The signalling system, however, affords an adequate indication of the nature of the emergency as to enable the pilot to exercise some judgment over the decision of how fast and where to land the aircraft. For example, in some emergencies, immediate landing is not necessary and the passengers are best protected merely by continuing in flight to the scheduled destination. An essential feature of the signalling system, however, is that it does not afford any means of communicating to the pilot the existence of a hijacker on the plane, or that hijacker's demand that the course of the plane be altered to take him to some other destination. By creating an emergency situation, in fact, the most that the intended hijacker can accomplish is the immediate landing of the aircraft at the nearest available airport.

The successful use of the system of the invention requires certain procedures and precautions to be followed in actual practice. For example, the cockpit crew members preferably enter the aircraft and close and latch the bulkhead door thereby isolating themselves from the passenger compartment before any passengers board the plane. Further, they remain in the closed cockpit until all passengers disembark. The necessary provisions for the comfort of the crew members in the cockpit during the flight will, of course, be apparent and obviously can be afforded with relative ease.

A factor of substantial importance to the successful utilization of the system of the invention in preventing hijacking is the widespread publicity of the installation and use of this invention in commercial aircraft. With sufficient publication, potential hijackers will realize in advance that any attempts to hijack will be totally fruitless since, indeed, there is no means by which anyone in the cabin can communicate to the pilot the demands of a hijacker to land at some distant airport where the hijacker can escape freely from the plane. He must be made to understand that the creation of any disturbance or emergency merely will result in the pilot's automatically landing the plane at the nearest airport. In any such emergency landing, the pilot will, of course, also have radioed ahead and alerted the ground crew of the emergency condition. Even where the hijacker is not aware of the installation of the system of the invention and the futility of a hijacking effort as a result thereof, the provision of the invention for isolating the cockpit from the cabin and providing only restricted communication therebetween, will prevent the hijacker in any event from succeeding.

Numerous modifications and adaptations of the system of the invention will be readily apparent to those skilled in the art and thus it is intended by the appended claims to cover all such modifications and adaptations as fall within the true spirit and scope of the invention.

What is claimed is:

1. A system for incorporation in an airplane to prevent hijacking comprising:
   means for isolating the cockpit and passenger cabin of the airplane to prevent forcible entry into the cockpit from the cabin,
   means affording verbal communication exclusively from the cockpit to the cabin, and
   A signalling system affording the exclusive means of communication from the passenger cabin to the cockpit and providing selective transmission of a plurality of predetermined messages for at least certain emergency conditions, excepting hijacking, and directing the pilot to land the airplane at an airport selected in accordance with the emergency condition as identified by the corresponding, selectively transmitted message.

2. A system as recited in claim 1 wherein said isolating means comprises:
   a bulkhead separating the cockpit and the cabin and having a doorway therein with a door mounted to close the doorway, and
   latch means for securing the door in closed position and operable exclusively from the cockpit.

3. A system as recited in claim 2 wherein said bulkhead and said door are constructed of bulletproof material.

4. A system as recited in claim 3 wherein said bulkhead and said door are constructed of fire resistant material.

5. A system as recited in claim 1 wherein said signalling system includes:
   transmitting means in said cabin and receiving means in said cockpit,
   said transmitting means including a plurality of actuation means corresponding to said predetermined messages and independently and selectively operable to effect the transmission of the respectively corresponding signal coded messages to said receiving means, and
   said receiving means including a plurality of indicating means responsive to respectively associated ones of said signal coded messages for indicating the message to a pilot in said cockpit.

6. A system for preventing airplane hijacking through isolation of the cockpit and cabin of the airplane while affording selective communication of predetermined messages therebetween to the exclusion of any indication of hijacking attempts, comprising:
   a bulkhead separating the cockpit and cabin of the airplane and affording a doorway therebetween,
   a door mounted to the bulkhead for closing the doorway,
   latch means for securing the door in the closed position and operable exclusively from the cockpit side of said door,
   means affording verbal communication from the cockpit to the cabin exclusively, and
   a signalling system affording selective transmission of predetermined signal coded messages from the cabin to the cockpit for communicating the existence of respectively corresponding emergency conditions excluding the presence of a hijacking effort and directing the pilot to land the airplane at a next available airport.

7. A system as recited in claim 6, wherein said signalling system includes:
   transmitting means in said cabin and receiving means in said cockpit,
   said transmitting means including a plurality of actuation means corresponding to said predetermined messages and independently and selectively operable to effect the transmission of the respectively corresponding signal coded messages to said receiving means, and
   said receiving means includes a plurality of indicating means responsive to respectively associated ones of said signal coded messages for indicating the message to a pilot in said cockpit.

8. In an airplane having a cockpit and a cabin separated by a bulkhead and door with a latching mechanism operable from the cockpit exclusively, a method for preventing airplane hijacking comprising:
   isolating the flight crew in charge of flying an airplane in the cockpit from the passengers in the cabin of the airplane by providing for entry of the crew into the cockpit and latching of the bulkhead door by the flight crew to secure the cockpit against forcible entry therein from the passenger cabin prior to entry of the passengers into the cabin,
   providing verbal communication exclusively from the cockpit to the cabin and preventing verbal communication from the cabin to the cockpit to prevent informing the flight crew of a hijacking attempt during flight operations,
   affording a signalling system for communicating from the cabin to the cockpit, selectively, any of a plurality of predetermined messages excepting an indication of a hijacking effort for indicating at least certain predetermined emergency conditions, and
   the pilot responding to receipt of a message indicating an emergency condition by landing the airplane at the next available airport.

* * * * *